(12) United States Patent
Awadalla et al.

(10) Patent No.: US 9,973,280 B2
(45) Date of Patent: May 15, 2018

(54) FEEDBACK CARRIER RECOVERY DEVICE

(71) Applicant: Infinera Corporation, Sunnyvale, CA (US)

(72) Inventors: Ahmed Awadalla, Gatineau (CA); Han Sun, Ottawa (CA); Kuang-Tsan Wu, Ottawa (CA)

(73) Assignee: Infinera Corporation, Sunnyvale, CA (US)

( * ) Notice: Subject to any disclaimer, the term of this patent is extended or adjusted under 35 U.S.C. 154(b) by 121 days.

(21) Appl. No.: 14/788,564

(22) Filed: Jun. 30, 2015

(65) Prior Publication Data

US 2016/0315714 A1    Oct. 27, 2016

Related U.S. Application Data

(60) Provisional application No. 62/151,381, filed on Apr. 22, 2015, provisional application No. 62/152,352, filed on Apr. 24, 2015.

(51) Int. Cl.
| | | |
|---|---|---|
| *H04B 10/61* | (2013.01) | |
| *H04B 10/079* | (2013.01) | |
| *H04L 7/00* | (2006.01) | |
| *H04L 27/00* | (2006.01) | |

(52) U.S. Cl.
CPC ....... *H04B 10/6165* (2013.01); *H04B 10/613* (2013.01); *H04L 27/00* (2013.01)

(58) Field of Classification Search
CPC .... H04B 10/6165; H04B 10/613; H04L 27/00
See application file for complete search history.

(56) References Cited

U.S. PATENT DOCUMENTS

| | | | | |
|---|---|---|---|---|
| 7,606,498 | B1 * | 10/2009 | Wu | H04B 10/60 398/152 |
| 9,130,807 | B1 * | 9/2015 | Novellini | H04L 1/20 |
| 2011/0129234 | A1 * | 6/2011 | Duan | G06F 7/5057 398/208 |
| 2012/0008952 | A1 * | 1/2012 | Li | H04B 10/50 398/65 |

(Continued)

OTHER PUBLICATIONS

Zhuge et al., "Pilot-aided carrier phase recovery for M-QAM using superscalar parallelization based PLL", Optical Society of America, vol. 20, No. 17, Aug. 10, 2012, 11 pages.

(Continued)

*Primary Examiner* — Shi K Li
*Assistant Examiner* — Mina Shalaby
(74) *Attorney, Agent, or Firm* — David L. Soltz

(57) ABSTRACT

A digital signal processor (DSP) may include a receiver configured to receive an input signal. The DSP may include a processor component to perform carrier recovery on a set of digital signals representing a set of symbols associated with the input signal. The DSP may include an output component to provide information included in the set of digital signals representing the set of symbols. The DSP may be configured to perform, for the input signal, phase estimation with a latency of less than approximately 880 nanoseconds and having a power consumption of less than approximately 400 milliwatts at an update rate greater than approximately 4 Gigahertz. The latency being a propagation delay of the input signal.

20 Claims, 11 Drawing Sheets

(56) References Cited

U.S. PATENT DOCUMENTS

| | | | | |
|---|---|---|---|---|
| 2013/0089341 A1* | 4/2013 | Roberts | ............. | H04B 10/6165 |
| | | | | 398/208 |
| 2013/0089342 A1* | 4/2013 | Oveis Gharan | .... | H04B 10/6165 |
| | | | | 398/208 |
| 2014/0363176 A1* | 12/2014 | Mizuguchi | ........... | H04B 10/611 |
| | | | | 398/204 |
| 2015/0215050 A1* | 7/2015 | Liu | ................... | H04B 10/6165 |
| | | | | 398/208 |
| 2015/0295703 A1* | 10/2015 | Park | ..................... | H04L 7/0016 |
| | | | | 375/354 |

OTHER PUBLICATIONS

Wikipedia, "Quadrature amplitude modulation", https://en.wikipedia.org/wiki/Quadrature_amplitude_modulation, Jun. 22, 2015, 7 pages.

Viterbi et al., "Nonlinear Estimation of PSK-Modulated Carrier Phase with Application to Burst Digital Transmission", IEEE Transactions on Information Theory, vol. IT-29, No. 4, Jul. 1983, 9 pages.

Pfau et al., "Hardware-Efficient Coherent Digital Receiver Concept With Feedforward Carrier Recovery for M-QAM Constellations", Journal of Lightwave Technology, vol. 27, No. 8, Apr. 15, 2009, 11 pages.

Zhou, "An Improved Feed-Forward Carrier Recovery Algorithm for Coherent Receivers With M-QAM Modulation Format", IEEE Photonics Technology Letters, vol. 22, No. 14, Jul. 2010, 3 pages.

Sun et al., "Novel 16QAM Carrier Recovery Based on Blind Phase Search", 2014 European Conference on Optical Communication, Cannes—France, Tu.1.3.4, 2014, 3 pages.

\* cited by examiner

FEEDBACK CARRIER RECOVERY DEVICE

RELATED APPLICATIONS

This application claims priority under 35 U.S.C. § 119 to U.S. Provisional Patent Application No. 62/151,381, filed on Apr. 22, 2015, the content of which is incorporated by reference herein in its entirety.

This application claims priority under 35 U.S.C. § 119 to U.S. Provisional Patent Application No. 62/152,352, filed on Apr. 24, 2015, the content of which is incorporated by reference herein in its entirety.

BACKGROUND

Wavelength division multiplexed (WDM) optical communication systems (referred to as "WDM systems") are systems in which multiple optical signals, each having a different wavelength, are combined onto a single optical fiber using an optical multiplexer circuit (referred to as a "multiplexer"). Such systems may include a transmitter circuit, such as a transmitter (Tx) photonic integrated circuit (PIC) having a transmitter component to provide a laser associated with each wavelength, a modulator configured to modulate the output of the laser, and a multiplexer to combine each of the modulated outputs (e.g., to form a combined output or WDM signal).

A WDM system may also include a receiver circuit having a receiver (Rx) PIC and an optical demultiplexer circuit (referred to as a "demultiplexer") configured to receive the combined output and demultiplex the combined output into individual optical signals.

Additionally, the receiver circuit may include receiver components to convert the optical signals into electrical signals, and output the data carried by those electrical signals.

SUMMARY

According to some possible implementations, an optical receiver may include a digital signal processor (DSP). The DSP may be configured to receive an input signal including a plurality of digital signals representing a plurality of symbols. The DSP may be configured to group the plurality of digital signals representing the plurality of symbols into a set of digital signal groups. The DSP may be configured to perform a Cartesian coordinate to polar coordinate conversion on a plurality of in-phase (I) and quadrature (Q) components of the plurality of digital signals representing the plurality of symbols. The DSP may be configured to determine a set of potential mean estimated phase errors for the set of digital signal groups based on performing the Cartesian coordinate to polar coordinate conversion on the plurality of I and Q components. The DSP may be configured to select a set of mean estimated phase errors from the set of potential mean estimated phase errors. The DSP may be configured to recover information included in the plurality of digital signals representing the plurality of symbols based on the input signal and the set of mean estimated phase errors.

According to some possible implementations, a carrier recovery device may include a delay matching component configured to delay an input signal by a particular amount of time. The carrier recovery device may include a polar conversion component configured to receive a real value and an imaginary value associated with a digital signal representing a symbol of the input signal and generate a phase value and an amplitude value, corresponding to the real value and the imaginary value, for the input signal. The carrier recovery device may include a phase detection component including a plurality of phase detectors. A phase detector, of the plurality of phase detectors, may be configured to de-rotate the phase value based on a de-rotating input to generate a de-rotated resultant phase value. The de-rotating input may be feedback based on performing phase detection on another symbol. The phase detector may be configured to use the amplitude value and the de-rotated resultant phase value to perform a look-up in a polar coordinate look-up table to determine a quantized phase error. The phase detector may be configured to determine a mean estimated phase error based on the quantized phase error and one or more other quantized phase errors associated with one or more other digital signals representing symbols of the input signal. The carrier recovery device may include a phase deselection component configured to select a particular phase detector, of the plurality of phase detectors, from which a particular mean estimated phase error is to be utilized and provide the particular mean estimated phase error. The carrier recovery device may include a combiner component configured to receive the input signal from the delay matching component, receive the particular mean estimated phase error from the phase deselection component, and combine a portion of the input signal with the particular mean estimated phase error to interpret one or more digital signals representing symbols of the input signal included in the portion of the input signal.

According to some possible implementations, a method may include receiving, by a device, a set of digital signals representing a set of symbols of an input signal during a single clock cycle. The method may include determining, by the device, a set of phases for the set of digital signals. The method may include de-rotating, by the device, the set of phases based on a set of potential de-rotating input phases to generate a set of de-rotated resultant phases. The method may include determining, by the device, a set of mean estimated phase errors for the set of digital signals based on the set of de-rotated resultant phases, a set of amplitudes for the set of digital signals, and a look-up table associated with a modulation format of the set of digital signals. The method may include determining, by the device, information carried by the set of digital signals based on the set of digital signals and the set of mean estimated phase errors.

According to some possible implementations, a digital signal processor (DSP) may include a receiver configured to receive an input signal. The DSP may include a processor component to perform carrier recovery on a set of digital signals representing a set of symbols associated with the input signal. The DSP may include an output component to provide information included in the set of digital signals representing the set of symbols. The DSP may be configured to perform, for the input signal, phase estimation with a latency of less than approximately 880 nanoseconds and greater than approximately 720 nanoseconds and having a power consumption of less than approximately 400 milliwatts and greater than approximately 300 milliwatts at an update rate greater than approximately 4 Gigahertz. The latency being a propagation delay of the input signal.

According to some possible implementations, a digital signal processor (DSP) may include a receiver configured to receive an input signal. The DSP may include a processor component to perform carrier recovery on a set of digital signals representing a set of symbols associated with the input signal. The DSP may include an output component to provide information included in the set of digital signals representing the set of symbols. The DSP may be configured to perform, for the input signal, phase estimation with a latency of less than approximately 880 nanoseconds and having a power consumption of less than approximately 400 milliwatts at an update rate greater than approximately 4 Gigahertz. The latency being a propagation delay of the input signal.

DETAILED DESCRIPTION

The following detailed description of example implementations refers to the accompanying drawings. The same reference numbers in different drawings may identify the same or similar elements.

In a wavelength division multiplexed (WDM) system, a transmitter may modulate an amplitude and/or a phase of a signal in order to convey data, via the signal, to a receiver where the signal may be demodulated to recover the data included in the signal. A particular modulation format (e.g., phase-shift keying (PSK), quadrature amplitude modulation (QAM), quadrature phase-shift keying (QPSK), binary phase-shift keying (BPSK), polarization-multiplexed multiplexed quadrature phase-shift keying (PM-QPSK), etc.) may be used to modulate the signal. When the signal is transmitted or received over a link, random phase fluctuations in the signal may be introduced via the transmitter, the receiver, and/or the link. These random phase fluctuations may be compensated by the receiver during carrier phase recovery to correct a phase error introduced into the modulated signal, thus permitting the receiver to properly decode the modulated signal.

In a coherent receiver, the received signal is sampled by analog-to-digital converters (ADCs) for signal processing. A feedback carrier recovery device (e.g., a feedback carrier recovery circuit) may estimate a carrier phase error for the received signal (or a portion thereof) utilizing a feedback loop. The feedback carrier recovery circuit may include a phase detector that measures phase error and a loop filter that reduces noise and facilitates tracking. However, for a square modulation format (e.g., 16-QAM, 32-QAM, 64-QAM, etc.), the feedback carrier recovery circuit may utilize complex multipliers to determine the estimated carrier phase error from phase information and amplitude information, which may require complex circuitry and unsatisfactory power consumption. Implementations, described herein, may facilitate carrier phase error estimation for a square modulation format without utilizing complex multipliers and/or for a non-square modulation format utilizing parallel processing. In this way, the feedback carrier recovery circuit may perform carrier phase error estimation, within a single clock cycle, for a set of symbols, of an input signal, received during a single clock cycle, thereby reducing latency, circuit complexity, gate count, and/or power consumption, relative to another feedback carrier recovery circuit design that utilizes complex multipliers and/or sequential phase error determination.

Figure 1:
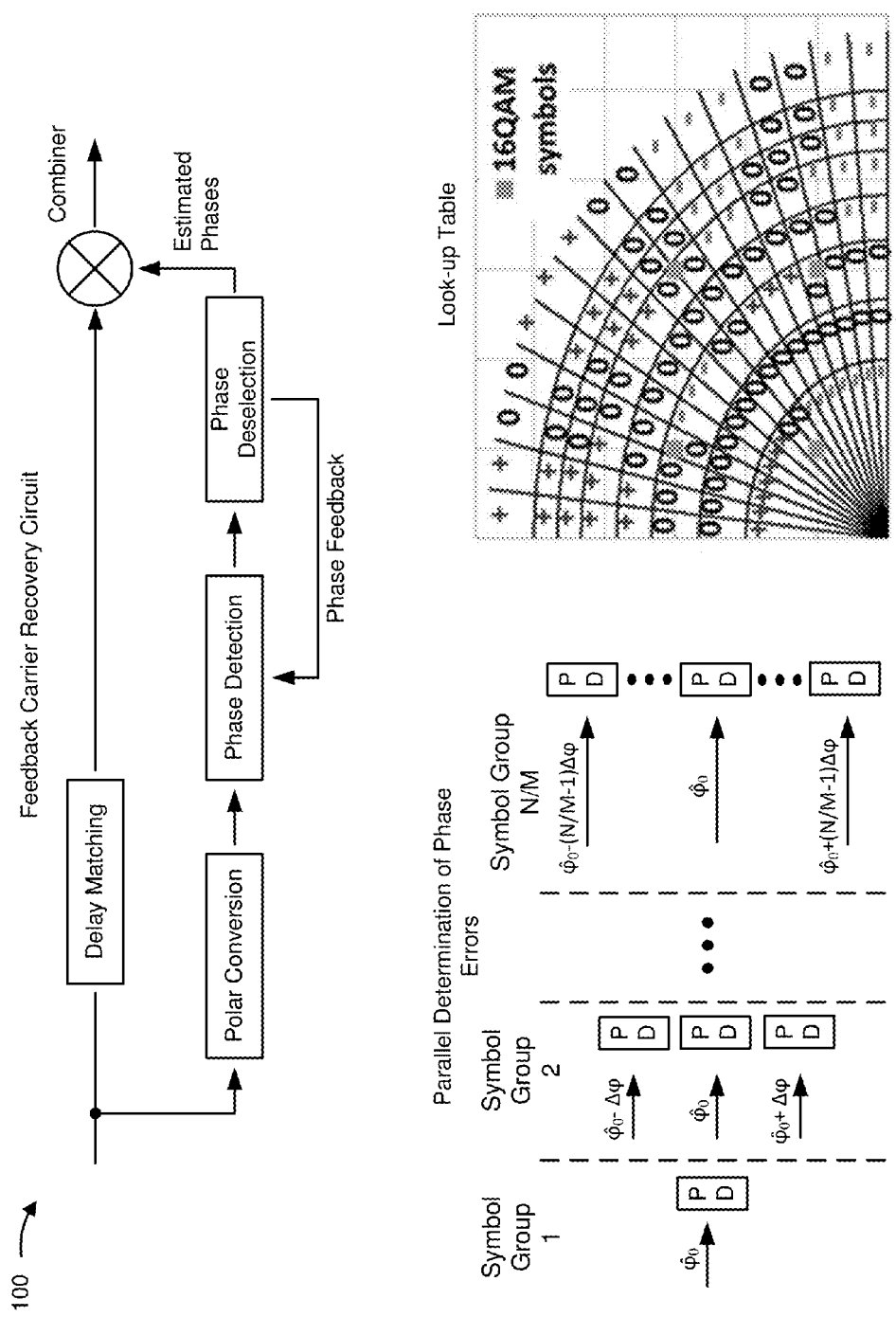
FIG. 1 is a diagram of an overview of an example implementation described herein.

FIG. 1 is a diagram of an overview of an example implementation 100 described herein. As shown in FIG. 1, a feedback carrier recovery circuit may include a delay matching component, a polar conversion component, a phase detection component, a phase deselection component, and a combiner component. The feedback carrier recovery circuit may receive a set of digital signals representing a set of symbols associated with an input signal, and may group the digital signals representing the set of symbols into groups of digital signals (e.g., groups of symbols). For example, the feedback carrier recovery circuit may receive 64 symbols during a clock cycle and may group the 64 symbols into 8 groups, with each digital signal group including 8 symbols (e.g., 8 digital signal representing 8 symbols). In another example, the feedback carrier recovery circuit may receive another quantity of symbols during a clock cycle. The feedback carrier recovery circuit may determine a mean estimated phase error for each group of 8 symbols based on phase information and amplitude information measured for one or more symbols. The feedback carrier recovery circuit may determine mean estimated phase error for a digital signal group, rather than an estimated phase error for each symbol, to improve performance and account for noise and/or inaccuracies in measuring an input signal that includes the symbols. The feedback carrier recovery circuit may utilize the polar conversion component to convert a real and an imaginary value associated with a symbol (e.g., a measurement of an input signal during a time interval associated with the symbol) in the Cartesian domain to a phase value and an amplitude value in the polar domain.

As further shown in FIG. 1, the feedback carrier recovery circuit may utilize the phase detection component and the phase deselection component in a feedback loop to determine the mean estimated phase error for each group of symbols. The phase detection component may include a set of phase detectors (PDs) that are associated with generating a quantized output representing a mean phase error for a group of symbols. The feedback carrier recovery circuit utilizes a look up table to identify a phase error for a particular symbol based on a de-rotated phase of the symbol (e.g., de-rotated based on a phase error estimated for a previous group of symbols) and an amplitude of the symbol ("0" represents no phase error, "+" represents a positive quantized phase error, and "−" represents a negative quantized phase error). For example, the look-up table may be utilized for a 16-QAM signal. For another M-ary QAM signal or a non-square modulation format signal (e.g., QPSK), another look-up table may be utilized.

As further shown in FIG. 1, the feedback carrier recovery circuit may perform parallel determination of phase errors to identify the estimated phase error for each digital signal group in a single clock cycle based on assumed inputs. For example, the feedback carrier recovery circuit may determine a set of potential mean estimated phase errors for a first digital signal group of a first clock cycle as a set of potential outputs. Further to the example, the feedback carrier recovery circuit may determine a set of potential mean estimated phase errors for a second digital signal group of the first clock cycle based on the set of potential outputs from the first digital signal group. The feedback carrier recovery circuit may determine potential mean estimated phase errors based on assumed inputs for each digital signal group of a clock cycle using multiple PDs in parallel, rather than sequentially performing phase error estimation, thereby reducing latency.

The feedback carrier recovery circuit may utilize the phase deselection component to perform deselection to determine which PDs are associated with the correct values and may provide the set of correct values as a set of estimated phases for the set of symbols. For example, the feedback carrier recovery circuit may, for the second digital signal group, select a PD that received the correct input from the first digital signal group. Similarly, for a third digital signal group, the feedback carrier recovery circuit may select a PD that received the correct input from the selected PD of the second digital signal group. The output of a selected PD may be added to a set of mean estimated phase errors that are utilized in carrier phase recovery. For example, the feedback carrier recovery circuit may utilize the combiner component to combine the set of symbols and the set of mean estimated phase errors to interpret the set of symbols (e.g., to recover a set of bits of information represented by the set of symbols).

By performing the set of calculations for each potential phase estimate in parallel utilizing multiple PDs, rather than awaiting the actual input from a previous phase detection, and utilizing a look-up table associated with the particular modulation format utilized for the input signal, the feedback carrier recovery circuit may perform phase error determination within a single clock cycle, thereby reducing latency, circuit complexity, power consumption, or the like relative to another feedback carrier recovery circuit configuration.

Figure 2:
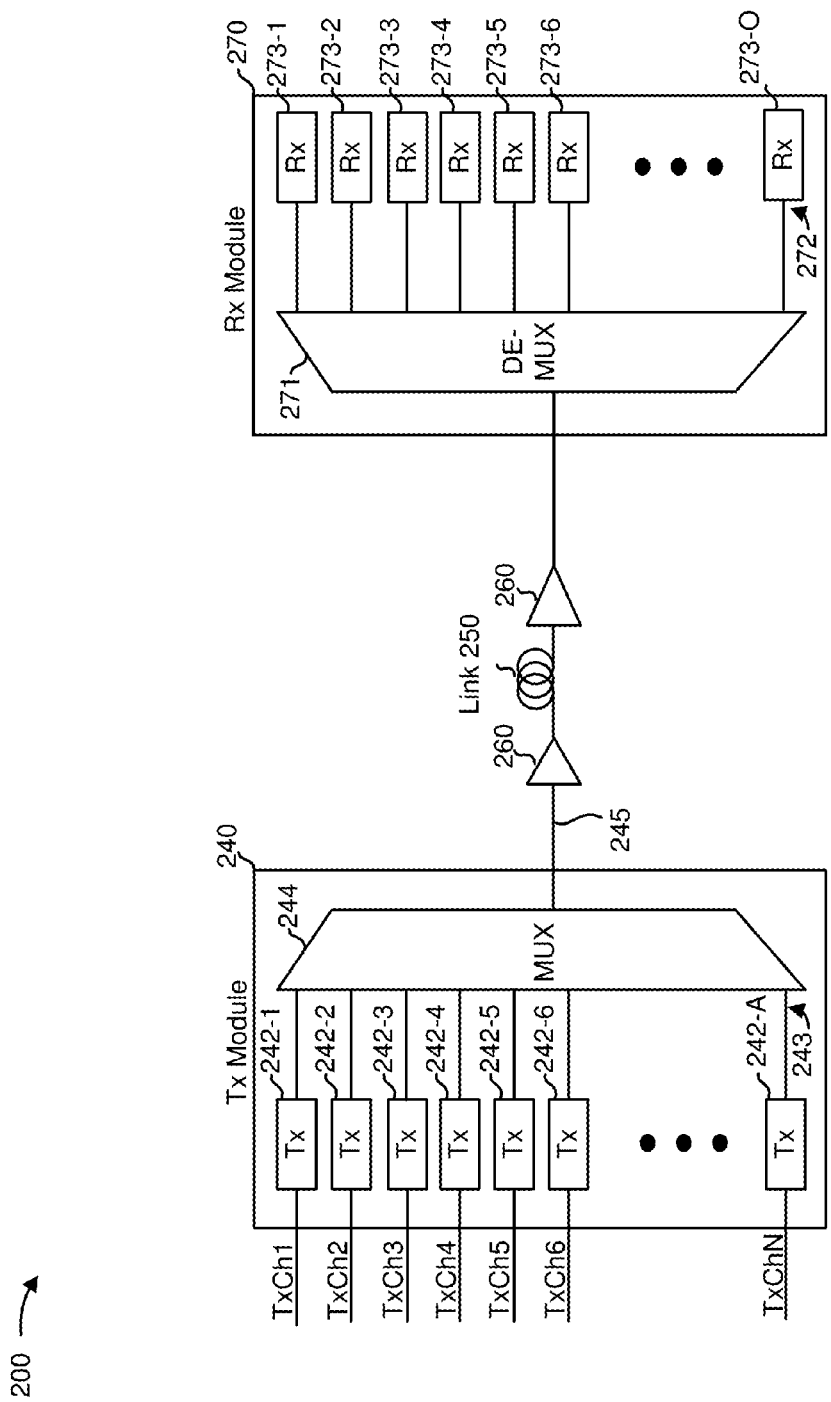
FIG. 2 is a diagram of an example network in which systems and/or methods, described herein, may be implemented.

FIG. 2 is a diagram of example devices of an optical network 200 that may be designed, monitored, and/or configured according to implementations described herein. One or more devices of FIG. 2 may operate within optical network 200. As shown in FIG. 2, optical network 200 may include transmitter module 240 (e.g., a Tx PIC) and/or receiver module 270 (e.g., an Rx PIC). In some implementations, transmitter module 240 may be optically connected to receiver module 270 via link 250 and/or optical amplifiers 260. One or more optical amplifiers 260 may amplify an optical signal as the optical signal is transmitted over link 250.

Transmitter module 240 may include a number of optical transmitters 242-1 through 242-A (A≥1), waveguides 243, and/or optical multiplexer 244. In some implementations, transmitter module 240 may include 5, 10, 20, 50, 100, or some other number of optical transmitters 242. Each optical transmitter 242 may be tuned to use an optical carrier of a designated wavelength.

Optical transmitter 242 may receive data for a data channel (shown as TxCh1 through TxChM), may create multiple sub-carriers for the data channel, may map data, for the data channel, to the multiple sub-carriers, may modulate the data with an optical signal (e.g., from a laser) to create a multiple sub-carrier output optical signal, and may transmit the multiple sub-carrier output optical signal. Optical transmitter 242 may be tuned to use an optical carrier of a designated wavelength. In some implementations, the grid of wavelengths emitted by optical transmitters 242 may conform to a known standard, such as a standard published by the Telecommunication Standardization Sector (ITU-T). Additionally, or alternatively the grid of wavelengths may be flexible and tightly packed to create a super channel.

Waveguides 243 may include optical links to transmit modulated outputs (referred to as "signal channels") of optical transmitters 242. In some implementations, each optical transmitter 242 may connect to one waveguide 243 or to multiple waveguides 243 to transmit signal channels of optical transmitters 242 to optical multiplexer 244. In some implementations, waveguides 243 may be made from a birefringent material and/or some other material.

Optical multiplexer 244 may include an arrayed waveguide grating (AWG) or some other multiplexing device. In some implementations, optical multiplexer 244 may combine multiple signal channels, associated with optical transmitters 242, into a wave division multiplexed (WDM) signal, such as optical signal 245. For example, optical multiplexer 244 may include an input (e.g., a first slab to receive input optical signals supplied by optical transmitters 242) and an output (e.g., a second slab to supply a single WDM signal associated with the input optical signals). Additionally, optical multiplexer 244 may include waveguides connected to the input and the output. In some implementations, optical multiplexer 244 may combine multiple output optical signals, associated with optical transmitters 242, in such a way as to produce a polarization diverse signal (e.g., also referred to herein as a WDM signal). As shown in FIG. 2, optical multiplexer 244 may provide the WDM signal to receiver module 270 via an optical fiber, such as link 250.

Optical multiplexer 244 may receive output optical signals outputted by optical transmitters 242, and may output one or more WDM signals. Each WDM signal may include one or more optical signals, such that each optical signal includes one or more wavelengths. In some implementations, one WDM signal may have a first polarization (e.g., a transverse magnetic (TM) polarization), and another WDM signal may have a second, substantially orthogonal polarization (e.g., a transverse electric (TE) polarization). Alternatively, both WDM signals may have the same polarization.

Link 250 may include an optical fiber. Link 250 may transport one or more optical signals associated with multiple wavelengths. Optical amplifier 260 may include an amplification device, such as a doped fiber amplifier, a Raman amplifier, or the like. Optical amplifier 260 may amplify the optical signals as the optical signals are transmitted via link 250.

As further shown in FIG. 2, receiver module 270 may include optical demultiplexer 271, waveguides 272, and/or optical receivers 273-1 through 273-O (O≥1). In some implementations, optical demultiplexer 271 may include an AWG or some other demultiplexing device. Optical demultiplexer 271 may supply multiple signal channels based on a received WDM signal (e.g., optical signal 245). As shown in FIG. 2, optical demultiplexer 271 may supply signal channels to optical receivers 273 via waveguides 272.

Waveguides 272 may include optical links to transmit outputs of optical demultiplexer 271 to optical receivers 273. In some implementations, each optical receiver 273 may receive outputs via a single waveguide 272 or via multiple waveguides 272. In some implementations, waveguides 272 may be made from a birefringent material and/or some other kind of material.

Optical receivers 273 may each operate to convert an input optical signal to an electrical signal that represents the transmitted data. In some implementations, optical receivers 273 may each include one or more photodetectors and/or related devices to receive respective input optical signals outputted by optical demultiplexer 271 and a local oscillator, convert the signals to a photocurrent, and provide a voltage output to function as an electrical signal representation of the original input signal.

The number and arrangement of devices and networks shown in FIG. 2 are provided as an example. In practice, there may be additional devices, fewer devices, different devices, or differently arranged devices than those shown in FIG. 2. Furthermore, two or more devices shown in FIG. 2 may be implemented within a single device, or a single device shown in FIG. 2 may be implemented as multiple, distributed devices. Additionally, or alternatively, a set of devices (e.g., one or more devices) of optical network 200 may perform one or more functions described as being performed by another set of devices of optical network 200.

Figure 3:
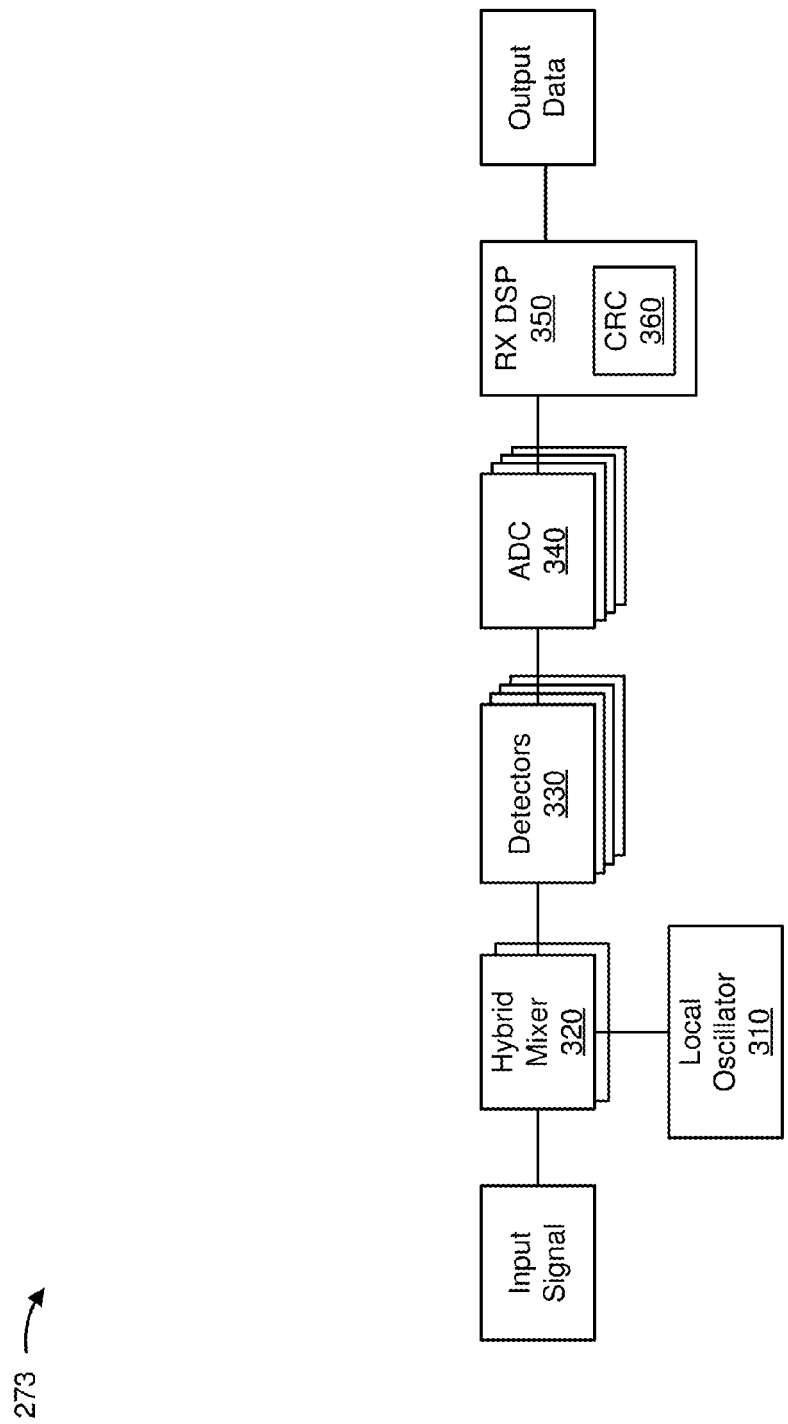
FIG. 3 is a diagram of example components of an optical receiver shown in FIG. 2.

FIG. 3 is a diagram of example components of optical receiver 273. As shown in FIG. 3, optical receiver 273 may include a local oscillator 310, one or more hybrid mixers 320, one or more detectors 330, one or more ADCs 340, and an RX DSP 350, which may include a carrier recovery component (CRC) 360. In some implementations, local oscillator 310, hybrid mixer 320, detector 330, ADC 340, and/or RX DSP 350 may be implemented on one or more integrated circuits, such as one or more PICs, one or more ASICs, or the like. In some implementations, components of multiple optical receivers 273 may be implemented on a single integrated circuit, such as a single PIC with one or more ASICs, to form a super-channel receiver.

Local oscillator 310 may include a laser or a similar device. In some implementations, local oscillator 310 may include a laser to provide an optical signal to hybrid mixer 320. In some implementations, local oscillator 310 may include a single-sided laser to provide an optical signal to hybrid mixer 320. In some implementations, local oscillator 310 may include a double-sided laser to provide multiple optical signals to multiple hybrid mixers 320.

Hybrid mixer 320 may include a combiner that receives a first optical signal (e.g., an input signal from optical demultiplexer 271) and a second optical signal (e.g., from local oscillator 310) and combines the first and second optical signals to generate a combined optical signal. In some implementations, hybrid mixer 320 may include a polarization beam splitter (PBS) which splits the first optical signal into two orthogonal signals. The two orthogonal signals may be combined with respective second optical signals (from a laser) with 90 degree phase with respect to each other. Hybrid mixer 320 may provide the combined optical signal to detector 330.

Detector 330 may include a photodetector, such as a photodiode, to receive the output optical signal, from hybrid mixer 320, and to convert the output optical signal to corresponding voltage signals. In some implementations, detector 330 may detect the entire spectrum of the output optical signal (e.g., containing all of the sub-carriers).

In some implementations, optical receiver 273 may include multiple detectors 330, which may be used to detect signals of respective in-phase (I) and quadrature (Q) components of the two orthogonal polarizations. For example, a polarization splitter may receive an input signal, and may split the input signal into two substantially orthogonal polarizations, such as the first polarization and the second polarization. Hybrid mixers 320 may combine the polarization signals with optical signals from local oscillator 310. For example, a first hybrid mixer 320 may combine a first polarization signal with the optical signal from local oscillator 310, and a second hybrid mixer 320 may combine a second polarization signal with the optical signal from local oscillator 310 with 90 degree phase with respect to the first polarization signal of the local oscillator.

Detectors 330 may detect the polarization signals to form corresponding voltage signals, and ADCs 340 may convert the voltage signals to digital samples. For example, two detectors 330 (e.g., balanced PIN diodes) may detect the first polarization signals to form the corresponding voltage signals, and a corresponding two ADCs 340 (e.g., that correspond to an I component and a Q component) may convert the voltage signals to digital samples for the first polarization signals. Similarly, two detectors 330 may detect the second polarization signals to form the corresponding voltage signals, and a corresponding two ADCs 340 (e.g., that correspond to an I component and a Q component) may convert the voltage signals to digital samples for the second polarization signals. RX DSP 350 may process the digital samples for the first and second polarization signals to generate resultant data, which may be outputted as output data.

ADC 340 may include an analog-to-digital converter that converts the voltage signals from detector 330 to digital samples. ADC 340 may provide the digital samples to RX DSP 350.

RX DSP 350 may include a digital signal processor. RX DSP 350 may receive the digital samples from ADC 340, may demultiplex the samples according to subcarriers of an optical signal, may independently process the samples for each of the subcarriers, may map the processed samples to produce output data, and may output the output data. RX DSP 350 may include CRC 360 (e.g., a feedback carrier recovery device), which may include one or more components for performing carrier recovery, as described in more detail elsewhere herein. CRC 360 may be utilized in single carrier signaling (e.g., 32 Gigabaud/sec signaling) or digital subcarrier signaling (e.g., 4 digital subcarriers, each at 8 Gigabaud/sec signaling).

The number and arrangement of components shown in FIG. 3 are provided as an example. In practice, optical receiver 273 may include additional components, fewer components, different components, or differently arranged components than those shown in FIG. 3. For example, the quantity of hybrid mixers 320, detectors 330, and/or ADCs 340 may be selected to implement an optical receiver 273 that is capable of receiving and processing a polarization diverse signal. Additionally, or alternatively, a set of components shown in FIG. 3 may perform one or more functions described herein as being performed by another set of components shown in FIG. 3.

Figure 4:
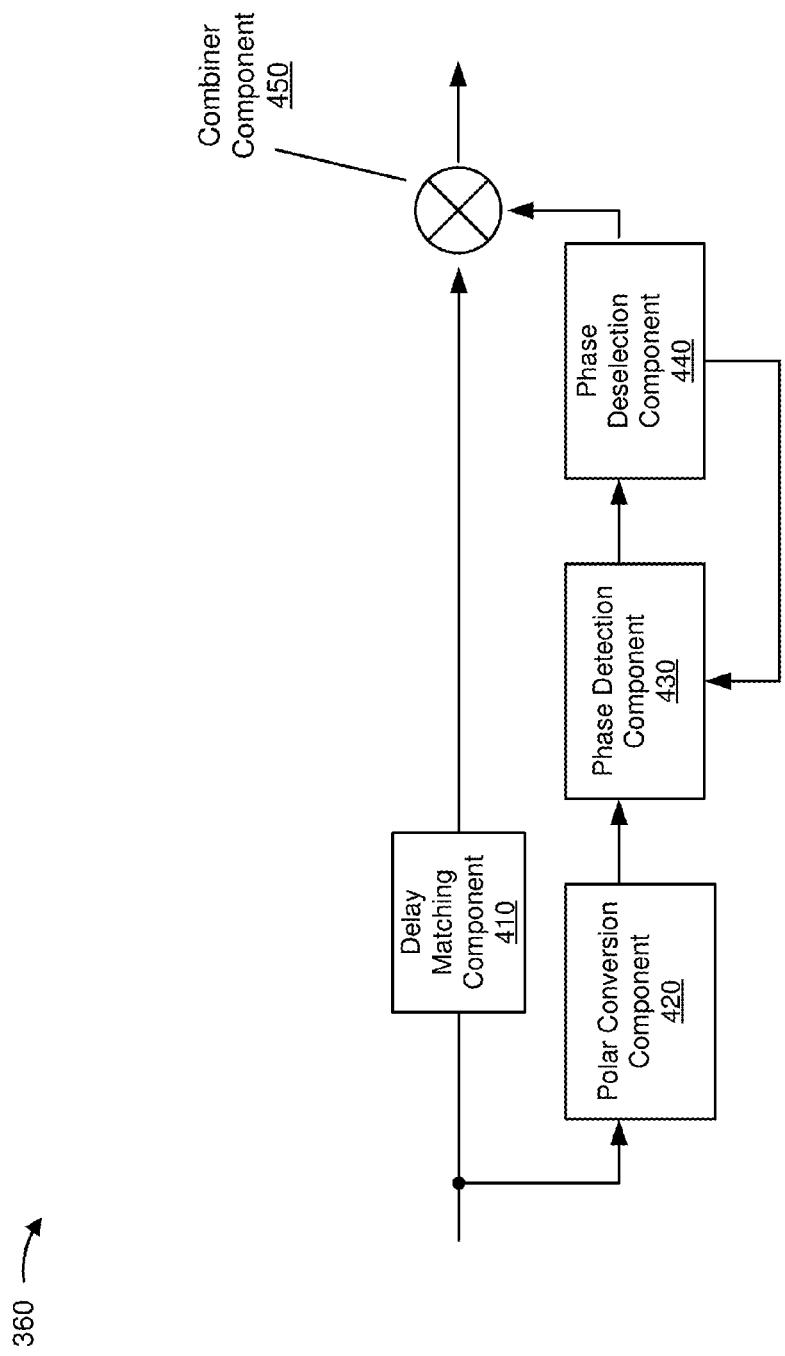
FIG. 4 is a diagram of an example components of a carrier recovery component shown in FIG. 3.

FIG. 4 is a diagram of example components of CRC 360. As shown in FIG. 4, CRC 360 may include a delay matching component 410, a polar conversion component 420, a phase detection component 430, a phase deselection component 440, and a combiner component 450. In some implementations, delay matching component 410, polar conversion component 420, phase detection component 430, phase deselection component 440, and/or combiner component 450 may be implemented on one or more integrated circuits, such as one or more PICs, one or more ASICs, or the like.

CRC 360 may receive an input signal (e.g., from an output of an equalizer), and may pass the input signal to delay matching component 410, which may delay the input signal to compensate for delay introduced by operations performed by other components of CRC 360 (e.g., components 420-440) prior to an adjustment signal being received by combiner component 450 (e.g., a set of estimated phases for a set of symbols). CRC 360 may also pass the input signal to polar conversion component 420. Components 420-440 may operate on the input signal to determine a set of estimated phase errors to be provided to combiner component 450.

Polar conversion component 420 may perform a Cartesian coordinate to polar coordinate conversion on the input signal. For example, polar conversion component 420 may receive a real value and an imaginary value corresponding to an I component and a Q component of an input signal during a time interval associated with a symbol (e.g., a sample time) in the Cartesian domain, and may convert the real value and the imaginary value to a phase value and an amplitude value in the polar domain.

Phase detection component 430 may perform phase error estimation for a set of symbols during a single clock cycle. For example, phase detection component 430 may receive a phase value and an amplitude value for a symbol, and may determine a phase error value to facilitate identifying the data carried by the symbol (e.g., a set of bits indicated by the symbol). Phase detection component 430 may utilize a set of phase detectors, which determine phase errors in parallel for each group of symbols of a clock cycle based on potential de-rotating phases for each group of symbols. For example, phase detection component 430 may utilize multiple phase detectors to generate a set of potential mean estimated phase errors, and phase deselection component 440 may facilitate selection of a set of mean estimated phase errors from the set of potential mean estimated phase errors. Further details of phase detection component 430 are described herein with regard to FIGS. 5A-5D.

Phase deselection component 440 may perform deselection of outputs of a set of phase detectors of phase detection component 430 and may provide feedback to phase detection component 430. For example, phase detection component 430 may generate a set of potential mean estimated phase errors in parallel utilizing a set of phase detectors, and phase deselection component 440 may facilitate selection, from the set of phase detectors, of a group of phase detectors representing a set of correct phase error estimates based on feedback from other phase detectors. In some implementations, phase deselection component 440 provides information identifying the set of mean estimated phase errors to phase detection component 430 as de-rotating inputs for adjusting one or more phase inputs when determining one or more estimated phase errors for the one or more phase inputs. Further details of phase deselection component 440 are described herein with regard to FIGS. 5A-5D.

Combiner component 450 may output an adjusted signal as an output signal from CRC 360. For example, combiner component 450 may receive the input signal from delay matching component 410 and may perform a set of adjustments to the input signal based on a set of mean estimated phase errors for symbols of the input signal, thereby generating an output signal from which the symbols of the input signal may be decoded. Decoding the input signal may include selecting a set of bits represented by the output signal, such as by utilizing a constellation diagram.

The number and arrangement of components shown in FIG. 4 are provided as an example. In practice, CRC 360 may include additional components, fewer components, different components, or differently arranged components than those shown in FIG. 4. Additionally, or alternatively, a set of components shown in FIG. 4 may perform one or more functions described herein as being performed by another set of components shown in FIG. 4.

FIGS. 5A-5D are diagrams of an example implementation 500. FIGS. 5A-5D show an example of carrier recovery performed by CRC 360.

Figure 5A:
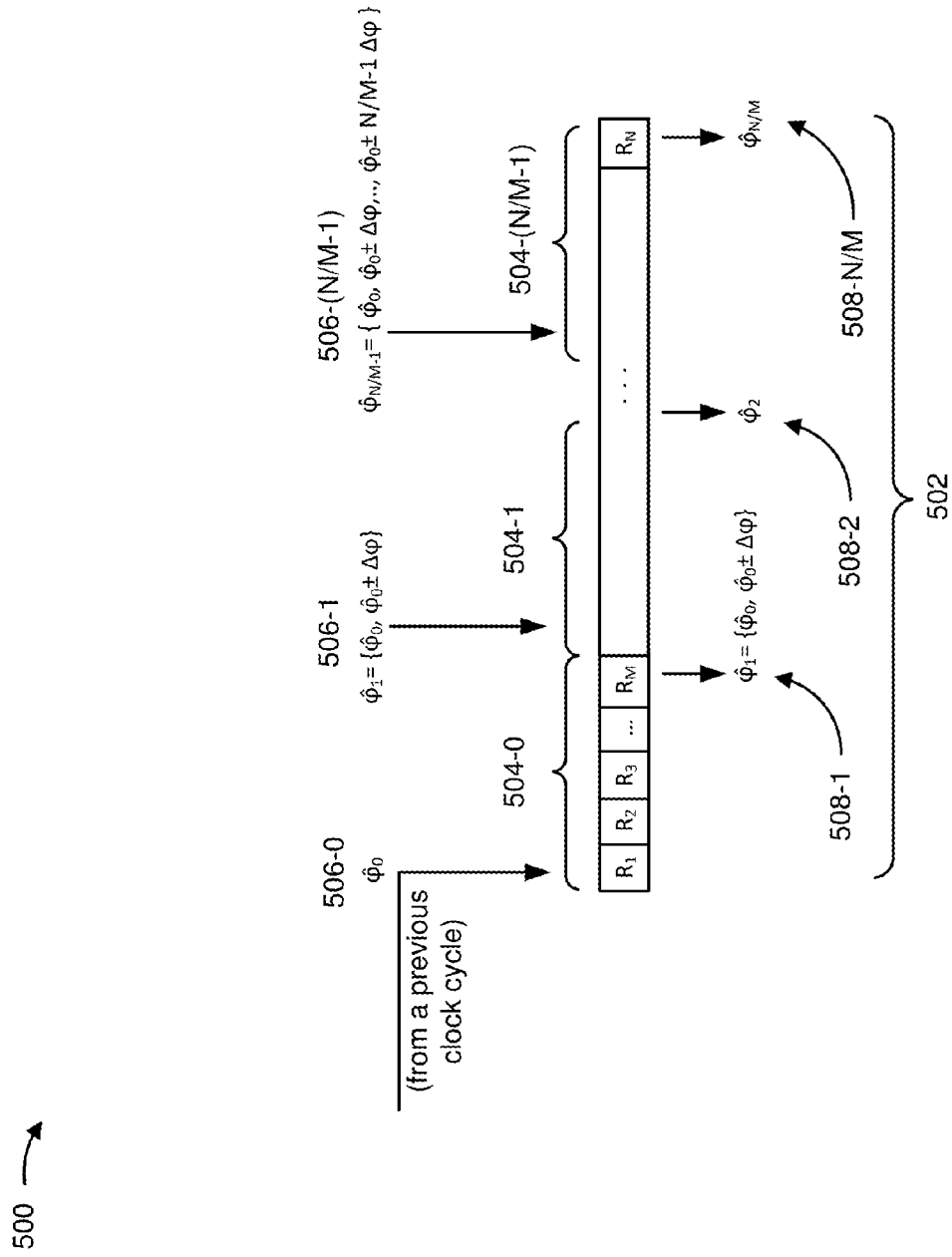
FIGS. 5A-5D are diagrams of an example implementation of carrier recovery performed by the carrier recovery component shown in FIG. 4.

As shown in FIG. 5A, and by reference number 502, CRC 360 receives a set of symbols $R_1$ through $R_N$ during a clock cycle 502. A symbol may refer to a portion of an input signal that represents an integer quantity of bits. For example, for 16-QAM, a symbol may represent 4 bits. Similarly, for another M-ary modulation, such as 32-QAM, 64-QAM, or the like, a symbol may represent another quantity of bits. As shown by reference numbers 504, the symbols of clock cycle 502 are grouped into a set of digital signal groups. The set of digital signal groups includes digital signal group 504-0 (e.g., symbols $R_1$ through $R_M$), digital signal group 504-1 (e.g., symbols $R_{M+1}$ through $R_{2M}$), . . . , and digital signal group 504-(N/M−1) (e.g., symbols $R_{(N-M)+1}$ through $R_N$). Assume that M represents a number of symbols grouped into each digital signal group and N represents a number of symbols received in each clock cycle. In some implementations, M may be selected as 8 symbols, such as for a 64 symbol clock cycle. In some implementations, X and Y polarizations of an input signal may each be averaged for determining a mean estimated phase error. CRC 360 performs grouping of symbols to determine a mean estimated phase error for a group of symbols, thereby reducing a potential effect of noise on an estimated phase error for each symbol and improving latency relative to determining an estimated phase error for each symbol.

As further shown in FIG. 5A, phase error determination may require de-rotation of a particular phase input. The particular phase input may refer to a measurement of a phase of a particular symbol (and may be associated with an amplitude of the particular symbol). CRC 360 may de-rotate a phase value by adjusting the phase input based on an estimated mean phase error of another digital signal group directly preceding the digital signal group that includes the symbol represented by the particular phase input. CRC 360 may utilize multiple phase detectors that generate quantized outputs. The quantized output of a phase detector may refer to an estimated phase error of a phase input (or a mean estimated phase error of a set of phase inputs associated with a digital signal group), and may be utilized as feedback for de-rotating another phase input of another phase detector. As shown by reference numbers 506, a de-rotating input is provided for each digital signal group. As shown by reference number 508, an estimated mean phase error is output for each digital signal group based on the set of phase inputs of each digital signal group and the de-rotating input for each digital signal group. The de-rotating input may include a set of potential de-rotating input phases.

For example, CRC 360 provides, for digital signal group 504-0, de-rotating input 506-0, $\hat{\varphi}_0$, (a potential input, of a set of potential inputs for de-rotating a phase input, generated based on an output from a digital signal group immediately preceding digital signal group 504-0 in a clock cycle immediately preceding clock cycle 502). CRC 360 generates output 508-1, $\hat{\varphi}_1$, as a mean estimated phase error for digital signal group 504-0. Output 508-1 includes a set of potential mean estimated phase errors (e.g., quantized outputs): $\hat{\varphi}_0$, $\hat{\varphi}_0 + \Delta\varphi$, or $\hat{\varphi}_0 - \Delta\varphi$. Output 508-1 corresponds to de-rotating input 506-1.

As another example, CRC 360 provides de-rotating input 506-1 for digital signal group 504-1. CRC 360 generates output 508-2, $\hat{\varphi}_2$, as a mean estimated phase error for digital signal group 504-0. Output 508-2 corresponds to de-rotating input 506-2 (not shown). As another example, CRC 360 provides de-rotating input 506-(N/M−1) for digital signal group 504-(N/M−1). De-rotating input 506-(N/M−1)

includes a set of potential de-rotating inputs, $\hat{\varphi}_{N/M-1}$, such as $\hat{\varphi}_0$, $\hat{\varphi}_0 + \Delta\varphi$, $\hat{\varphi}_0 + 2\Delta\varphi$, ..., $\hat{\varphi}_0 + (N/M-1)\Delta\varphi$, $\hat{\varphi}_0 - \Delta\varphi$, $\hat{\varphi}_0 - 2\Delta\varphi$, ..., and $\hat{\varphi}_0 - (N/M-1)\Delta\varphi$. CRC 360 generates output 508-N/M, $\hat{\varphi}_{N/M}$, as a mean estimated phase error for digital signal group 504-(N/M)-1. Output 508-N/M corresponds to de-rotating input 506-0 of another clock cycle directly proceeding after clock cycle 502 (e.g., proceeding without any intervening clock cycles).

In this way, CRC 360 may generate a set of estimated mean phase errors for a set of estimated de-rotating phases for a set of digital signal groups.

Figure 5B:
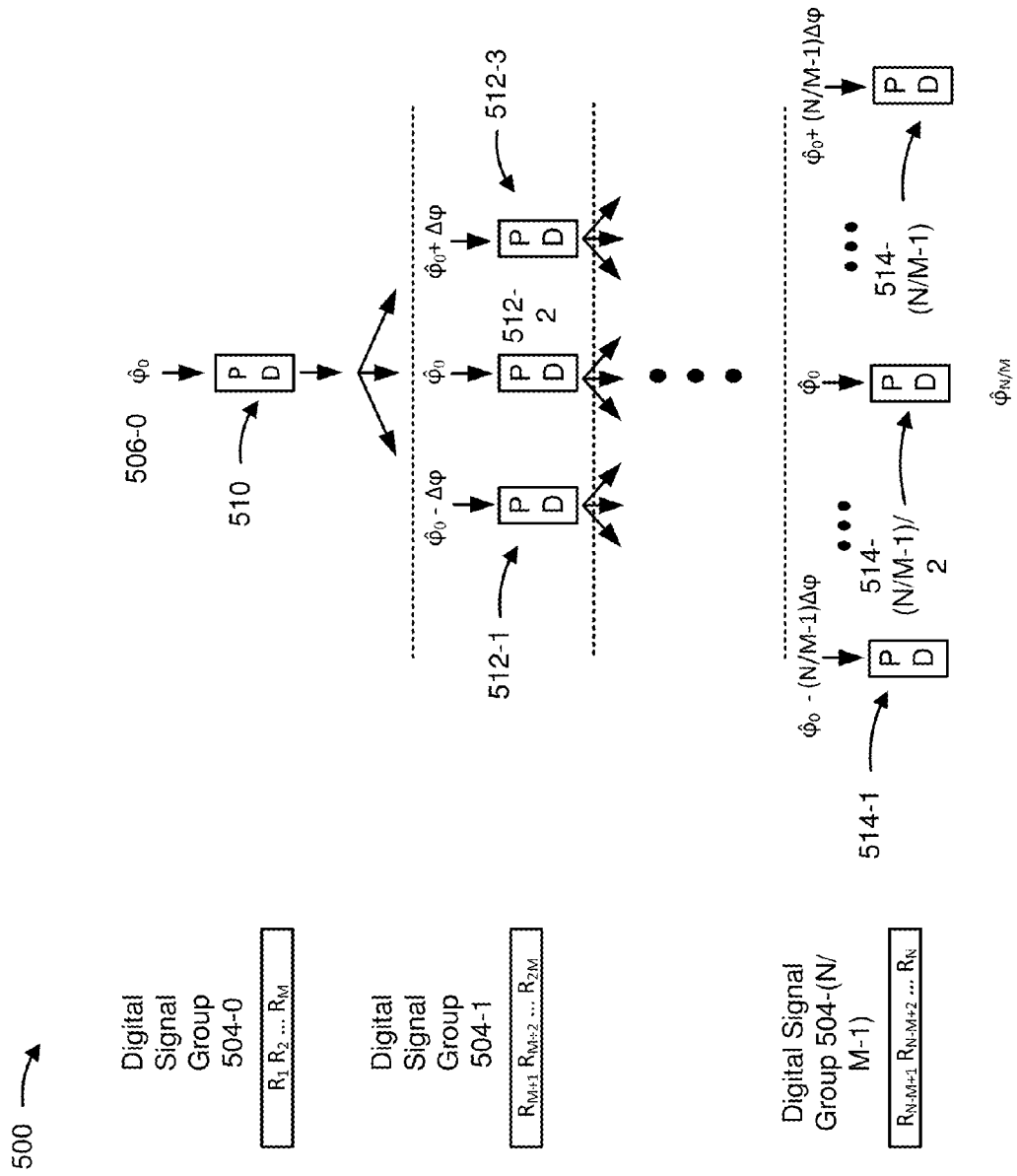

As shown in FIG. 5B, CRC 360 utilizes multiple phase detectors (PDs) to determine, in parallel, multiple mean estimated phase errors based on a set of de-rotating inputs. As shown, a PD 510 receives de-rotating input 506-0. PD 510 generates the quantized outputs of output 508-1. PD 510 provides each quantized output of output 508-1 to a different PD associated with digital signal group 504-1.

As shown, a set of PDs 512 associated with digital signal group 504-1 receive de-rotating inputs 506-1 (e.g., quantized outputs of output 508-1). For example, PD 512-1 receives quantized output $\hat{\varphi}_0 - \Delta\varphi$, PD 512-2 receives quantized output $\hat{\varphi}_0$, and PD 512-3 receives quantized output $\hat{\varphi}_0 + \Delta\varphi$. Each PD 512 generates a set of outputs that, collectively, form output 508-2 which is provided as de-rotating inputs 506-2 for digital signal group 504-2 (not shown). By utilizing multiple PDs 512 for the multiple de-rotating inputs of de-rotating input 506-1, CRC 360 may perform parallel determination of output 508-2.

As shown, a set of PDs 514 receive de-rotating inputs of de-rotating input 506-(N/M-1) and generate output 508-(N/M). By utilizing multiple PDs 514 for the multiple de-rotating inputs of de-rotating input 506-(N/M-1), CRC 360 may perform parallel determination of output 508-(N/M).

Figure 5C:
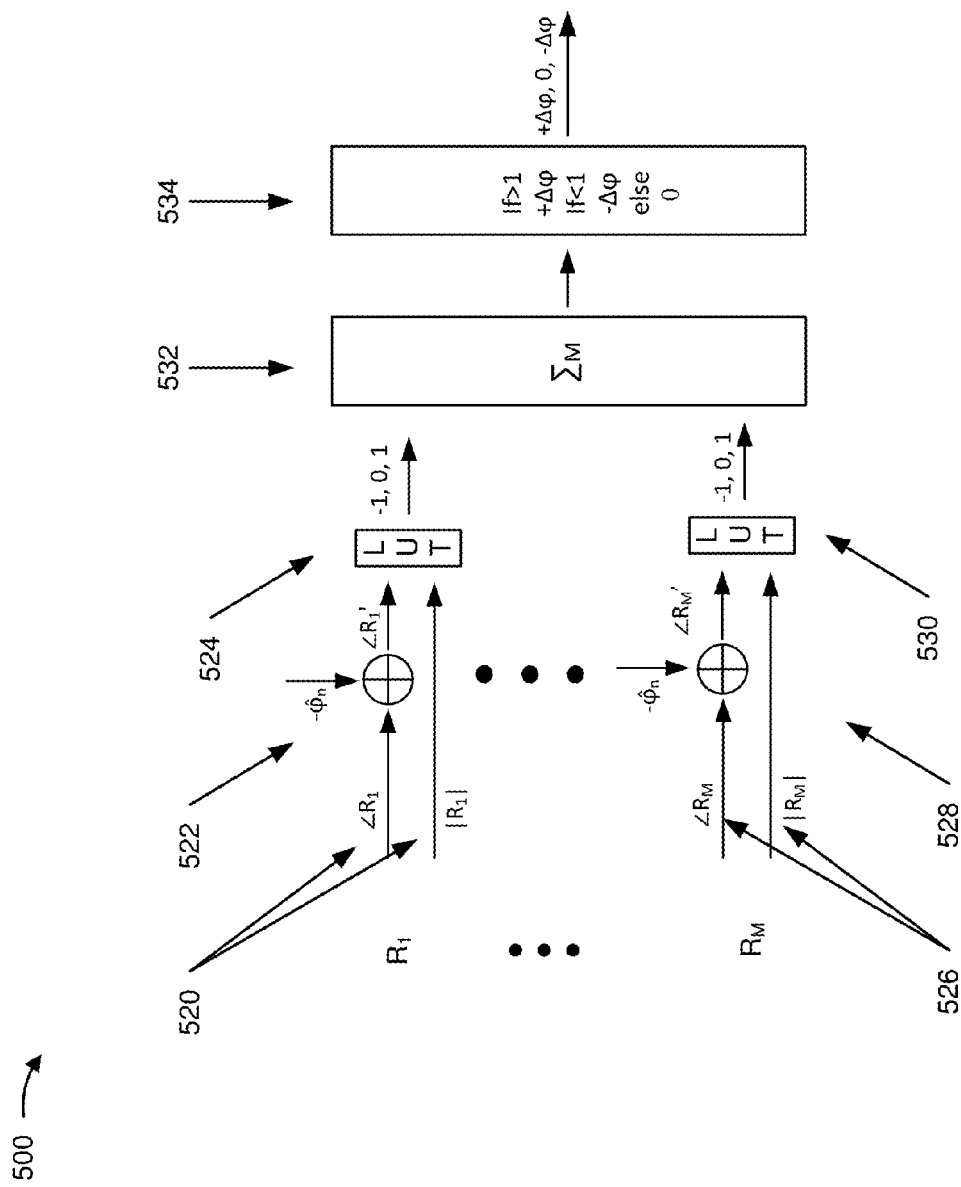

As shown in FIG. 5C, a particular PD of phase detection component 430 and of CRC 360 may receive a set of inputs relating to digital signal group 504-1 (e.g., symbol $R_1$ through symbol $R_M$). As shown by reference number 520, symbol $R_1$ is received as an input phase $\angle R_1$ and an input amplitude $|R_1|$. As shown by reference number 522, a de-rotating input, $-\hat{\varphi}_n$, is added to input phase $\angle R_1$, generating de-rotated resultant phase value, $\angle R_1'$. As shown with regard to reference number 524, the input amplitude and the de-rotated resultant phase are compared with a look-up table (LUT) to determine a quantized phase error value (e.g., -1, 0, 1). The look-up table is described in detail with regards to FIGS. 6A and 6B. In some implementations, CRC 360 may utilize three most significant bits (MSBs) of the input amplitude and four MSBs of the de-rotated resultant phase (e.g., which may correspond to the de-rotated resultant phase modulo 90 degrees) when utilizing the look-up table. Additionally, or alternatively, CRC 360 may utilize another particular quantity of MSBs.

As further shown with regard to FIG. 5C, CRC 360 generates quantized phase errors for other symbols R (e.g., phase errors associated with a quantized value). For example, as shown by reference numbers 526-530, CRC 360 may generate a de-rotated resultant phase for symbol $R_M$ as $\angle R_M'$ and utilize the resultant phase and an input amplitude for symbol $R_M$ ($|R_M|$) to determine a quantized phase error value for $R_M$. As shown by reference number 532, CRC 360 may add each quantized phase error value to determine a total phase error value and, as shown by reference number 534, CRC 360 may determine a mean estimated phase error based on the total phase error value. For example, if the total phase error value is greater than 1, CRC 360 determines the mean estimated phase error to be $+\Delta\varphi$; if the total phase error value is between -1 and 1, inclusive, CRC 360 determines the mean estimated phase error to be 0; and if the total phase error value is less than 1, CRC 360 determines the mean estimated phase error to be $-\Delta\varphi$. The PD provides the mean estimated phase error as, for example, output 508-1 in FIG. 5A, which is used as de-rotating input 506-1 for digital signal group 504-1.

Figure 5D:
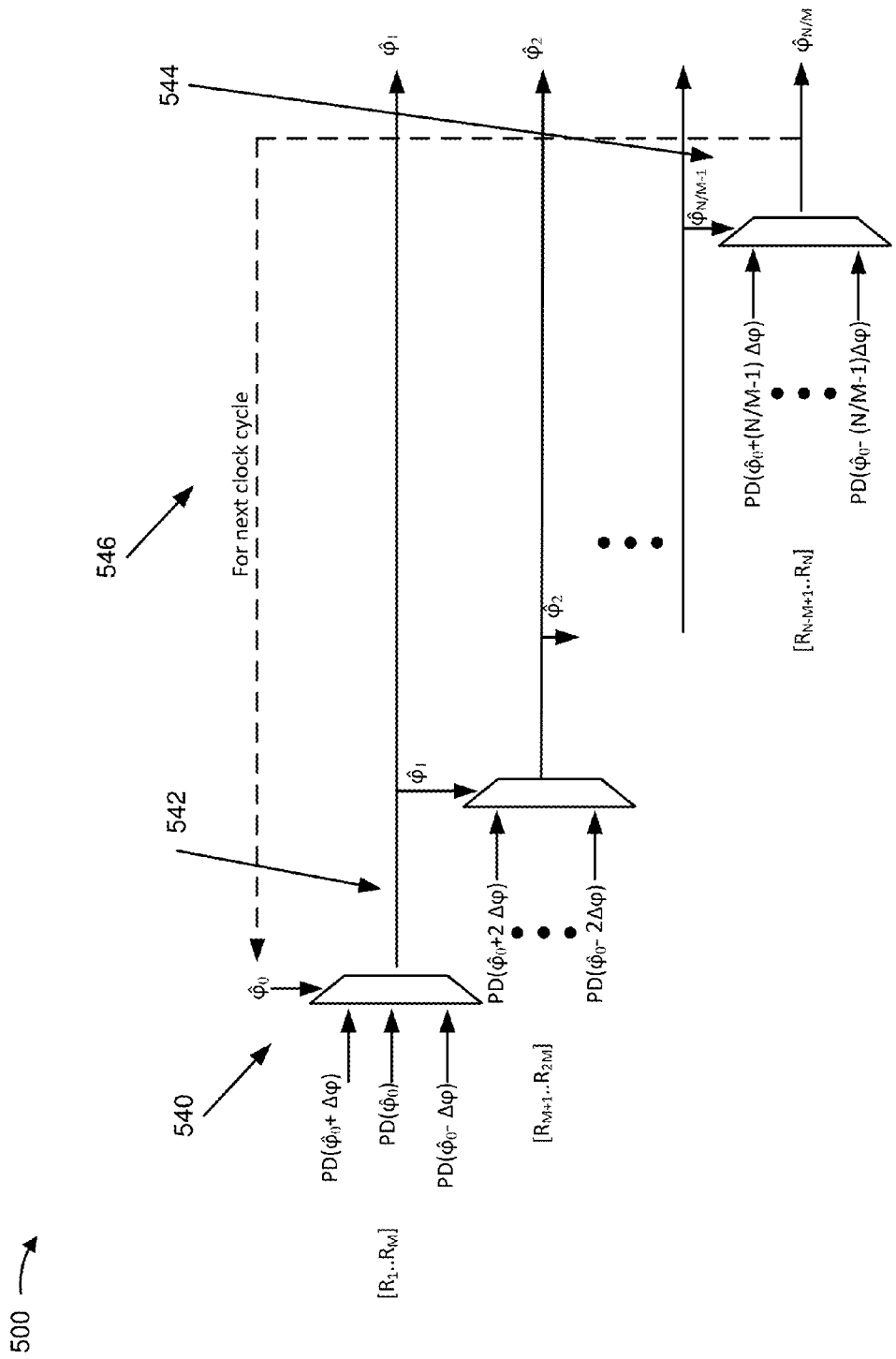

As shown in FIG. 5D, phase deselection component 440 of CRC 360 may perform phase deselection (e.g., selecting a set of PDs from which to utilize output values as mean estimated phase errors that are applied to an input signal of the set of symbols of clock cycle 502). As shown by reference number 540, CRC 360 receives an initial phase error, $\hat{\varphi}_0$ for a first selector (e.g., a multiplexer that performs a selection based on a phase error input). The initial phase error represents a mean estimated phase error associated with a digital signal group of a clock cycle immediately preceding clock cycle 502. CRC 360 utilizes the first selector to determine from which PD to select an output value. For example, PD($\hat{\varphi}_0 + \Delta\varphi$) corresponds to PD 512-3 of FIG. 5B. Similarly, PD($\hat{\varphi}_0$) corresponds to PD 512-2 and PD($\hat{\varphi}_0 - \Delta\varphi$) corresponds to PD 512-1, each of FIG. 5B. Assume that CRC 360 selects PD($\hat{\varphi}_0$). In this case, output of PD($\hat{\varphi}_0$) is utilized as phase error input, $\hat{\varphi}_1$, for digital signal group 504-2.

As further shown in FIG. 5D, and by reference number 542, CRC 360 provides the output of the first selector as input for a second selector and as a first mean estimated phase error, $\hat{\varphi}_1$. Similarly, as shown by reference number 544, CRC 360 provides the output of an N/M-1th selector as input for an N/Mth selector, from which CRC 360 generates N/Mth mean estimated phase error, $\hat{\varphi}_{N/M}$. The N/Mth mean estimated phase error is provided as input for the next clock cycle directly proceeding after clock cycle 502, as shown by reference number 546. In this way, CRC 360 may perform deselection for the set of PDs that are utilized to perform phase estimation in parallel. CRC 360 may utilize the set of mean estimated phase errors selected using the selectors to adjust an input signal and interpret symbols included therein.

As indicated above, FIGS. 5A-5D are provided merely as an example. Other examples are possible and may differ from what was described with regard to FIGS. 5A-5D.

Figure 6A:
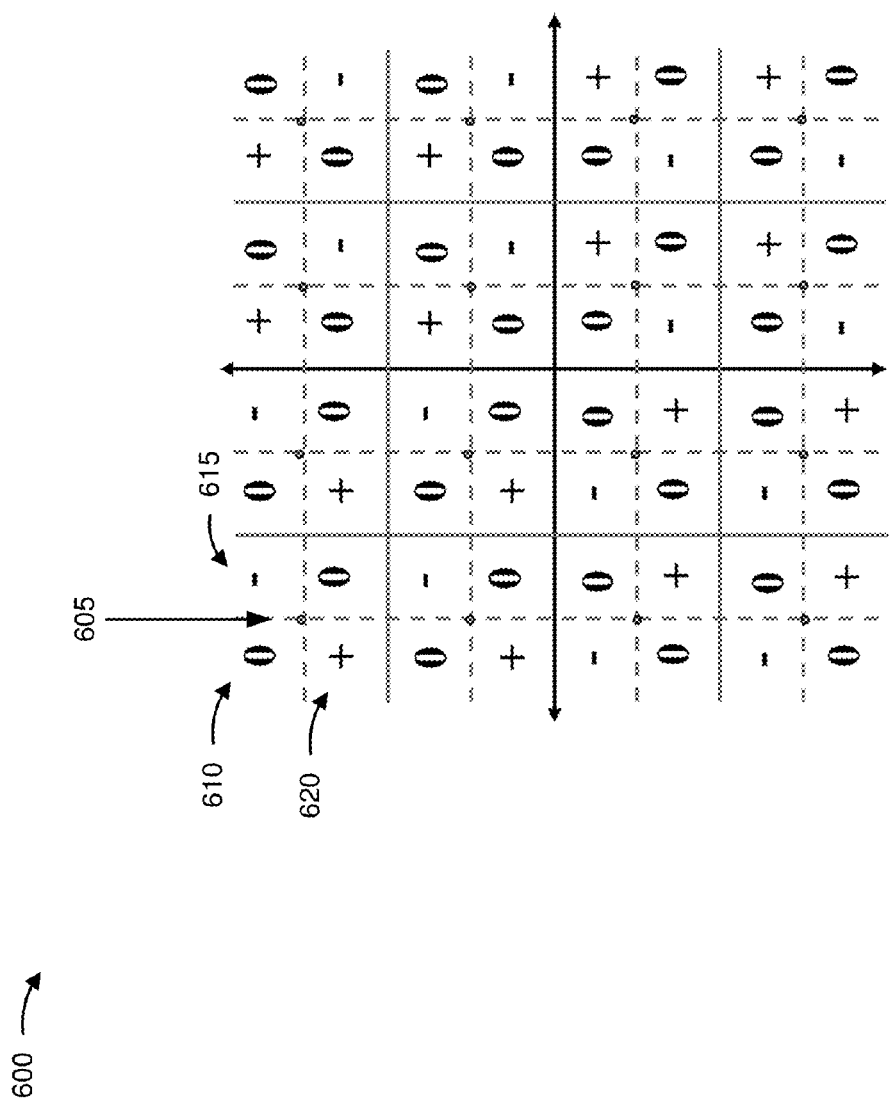
FIGS. 6A and 6B are examples of a look-up table utilized by the carrier recovery component shown in FIG. 4.
Figure 6B:
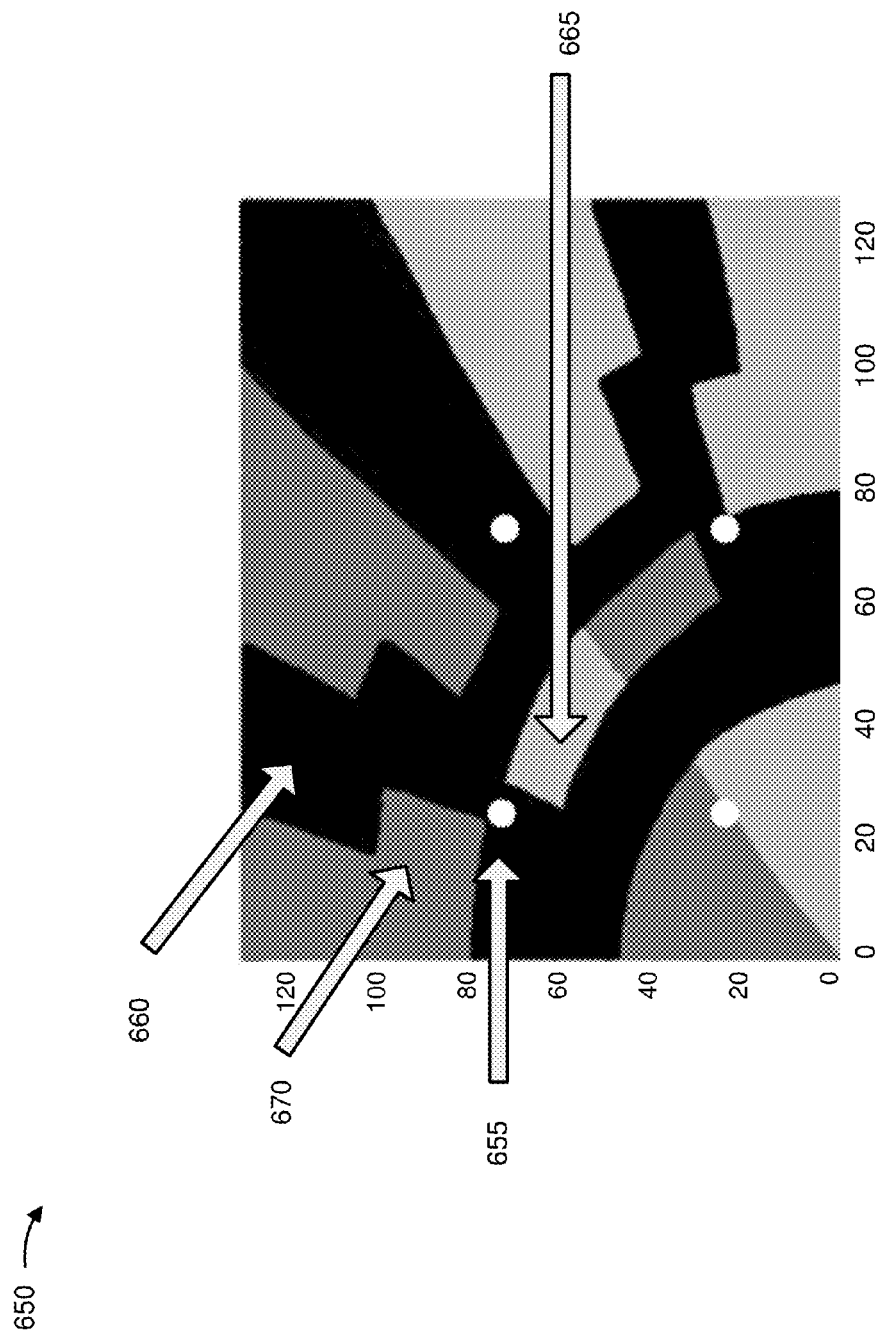

FIGS. 6A and 6B are diagrams of a first look-up table 600 and a second look-up table 650, respectively.

FIG. 6A shows an example of a first look-up table for 16-QAM. Reference number 605 shows an example of an intended location in an I-Q plot for a 16-QAM symbol. A symbol detected in area 610 is assigned a phase error of '0,' indicating no phase error. A symbol detected in area 615 is assigned a phase error of '−,' indicating a negative phase error. A symbol detected in area 620 is assigned a phase error of '+,' indicating a positive phase error. Utilizing the first look-up table with 16-QAM (or a similar look-up table with another M-ary QAM format, such as 32-QAM, 64-QAM, or the like) may result in complex multiplication and signals represented in the complex domain, which may be undesirable.

FIG. 6B, shows an example of a first quadrant of the complex plane in a second look-up table (e.g., a polar coordinate look-up table) for 16-QAM that may be utilized by CRC 360, such as is indicated with regard to FIG. 5C. Reference number 655, shows an example of intended location in an IQ plot for 16-QAM symbols using 8 real bits and 8 imaginary bits of a received 16-QAM signal. A symbol detected in area 660 is assigned a phase error of '0,' indicating no phase error. A symbol detected in area 665 is assigned a phase error of '−,' indicating a negative phase error. With regard to reference number 532 of FIG. 5C, the negative phase error may be considered a value of −1. A symbol detected in area 670 is assigned a phase error of '+,' indicating a positive phase error. With regard to reference number 532 of FIG. 5C, the positive phase error may be considered a value of 1. The second look-up table may correspond to the look-up table of FIG. 1, with 0's, +'s, and −'s represented as shaded regions.

Although the look-up tables of FIGS. 6A and 6B are described, herein, as tables or charts, the look-up tables of FIGS. 6A and 6B may be represented in another format, such as a data structure, a set of values, or the like.

As indicated above, FIGS. 6A and 6B are provided merely as examples. Other examples are possible and may differ from what was described with regard to FIGS. 6A and 6B.

Figure 7:
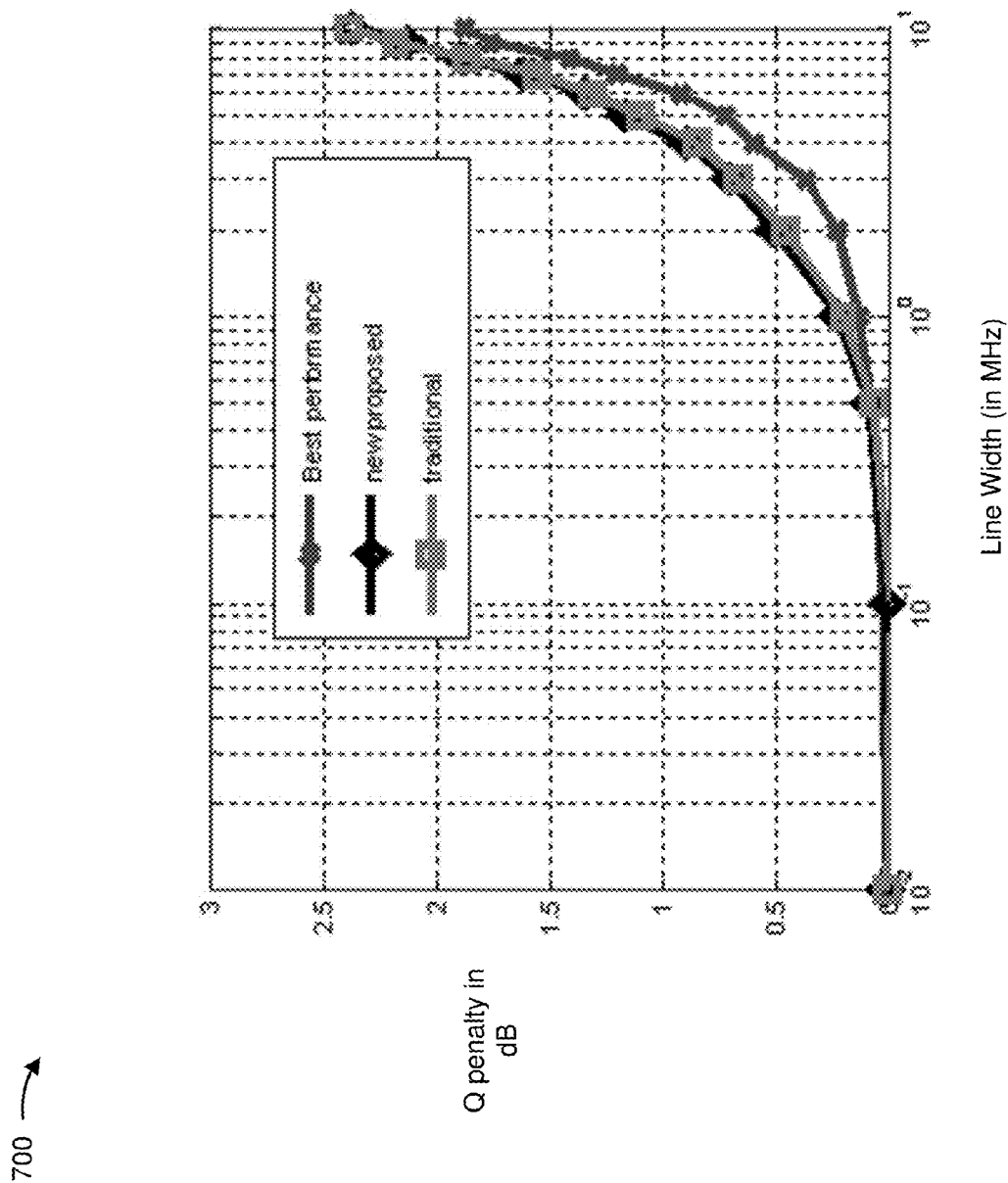
FIG. 7 illustrates example results of performing carrier recovery utilizing the carrier recovery component shown in FIG. 4.

FIG. 7 is a diagram of an example illustration 700 that illustrates example results of performing carrier recovery utilizing CRC 360.

As shown in FIG. 7, RX DSP 350 (e.g., a digital signal processor including a receiver component to receive an input signal, a processor component to perform carrier recovery on a set of digital signal representing the input signal, an output component to provide information included in the plurality of digital signals, or the like) may utilize CRC 360 to achieve performance approximately similar to other phase recovery circuit configurations until a line width of 1 Megahertz (MHz). RX DSP 350 may perform phase estimation with a latency (e.g., a propagation delay of the input signal) of approximately 800 nanometers plus or minus approximately 80 nanometers and may have a power consumption of less than approximately 400 milliwatts and greater than approximately 300 milliwatts with an approximately 4 Gigahertz update rate and a 28 nanometer minimum feature size. In some implementations, power consumption and/or latency may scale as feature size is reduced. The latency may be determined relative to a timing reference, a clock cycle, an information rate, or the like. The "Best performance" line represents an idealized symbol-by-symbol feedback determined based on a Cartesian phase detector, such as in association with the lookup table of FIG. 6A. The "traditional" line represents another type of 16-QAM phase detector. The "new proposed" line represents performance of a phase detector designed as described herein. Although a decibel penalty increases after 1 MHz the penalty is still within an acceptable range for an optical network, such as optical network 200. In some implementations, CRC 360 may facilitate a power reduction of approximately 10 times relative to another type of recovery circuit and/or a latency improvement of approximately 4.2 times relative to another type of recovery circuit. In this way, CRC 360 may achieve sufficient performance with significant reductions in power consumption and latency relative to other carrier recovery circuits.

As indicated above, FIG. 7 is provided merely as an example. Other examples are possible and may differ from what was described with regard to FIG. 7.

In this way, CRC 360 may facilitate phase error determination and carrier recovery based thereon utilizing a feedback loop, parallel processing of estimated phase errors, and a polar coordinate look-up table that obviates a need for complex multiplication, thereby facilitating reduced circuit complexity, latency, and/or power consumption relative to other carrier recovery circuit configurations.

The foregoing disclosure provides illustration and description, but is not intended to be exhaustive or to limit the implementations to the precise form disclosed. Modifications and variations are possible in light of the above disclosure or may be acquired from practice of the implementations.

Even though particular combinations of features are recited in the claims and/or disclosed in the specification, these combinations are not intended to limit the disclosure of possible implementations. In fact, many of these features may be combined in ways not specifically recited in the claims and/or disclosed in the specification. Although each dependent claim listed below may directly depend on only one claim, the disclosure of possible implementations includes each dependent claim in combination with every other claim in the claim set.

No element, act, or instruction used herein should be construed as critical or essential unless explicitly described as such. Also, as used herein, the articles "a" and "an" are intended to include one or more items, and may be used interchangeably with "one or more." Furthermore, as used herein, the term "set" is intended to include one or more items (e.g., related items, unrelated items, a combination of related and unrelated items, etc.), and may be used interchangeably with "one or more." Where only one item is intended, the term "one" or similar language is used. Also, as used herein, the terms "has," "have," "having," or the like are intended to be open-ended terms. Further, the phrase "based on" is intended to mean "based, at least in part, on" unless explicitly stated otherwise.

What is claimed is:

1. An optical receiver, comprising:
   a digital signal processor configured to:
   receive an input signal including a plurality of digital signals representing a plurality of symbols;
   group the plurality of digital signals representing the plurality of symbols into a set of digital signal groups;
   perform a Cartesian coordinate to polar coordinate conversion on a plurality of in-phase (I) and quadrature (Q) components of the plurality of digital signals representing the plurality of symbols;
   determine a set of potential mean estimated phase errors for the set of digital signal groups based on performing the Cartesian coordinate to polar coordinate conversion on the plurality of I and Q components;
   select a set of mean estimated phase errors from the set of potential mean estimated phase errors; and
   recover information included in the plurality of digital signals representing the plurality of symbols based on the input signal and the set of mean estimated phase errors.

2. The optical receiver of claim 1, where the digital signal processor, when determining the set of potential mean estimated phase errors, is configured to:
   determine a potential mean estimated phase error, of the set of potential mean estimated phase errors, for a digital signal group, of the set of digital signal groups, using a set of potential inputs for a phase detector of the plurality of phase detectors,
   the set of potential inputs being based on one or more potential outputs of determining another potential mean estimated phase error for another digital signal group that is immediately preceding the digital signal group.

3. The optical receiver of claim 1, where the digital signal processor, when determining the set of potential mean estimated phase errors, is configured to:
receive, as feedback of a feedback loop, a de-rotating input; and
apply the de-rotating input to a phase associated with a digital signal, of the plurality of digital signals, to generate a de-rotated resultant phase; and
determine a potential mean estimated phase error, of the set of potential mean estimated phase errors, based on comparing the de-rotated resultant phase and an amplitude associated with the digital signal to the polar coordinate look-up table.

4. The optical receiver of claim 3, where the digital signal processor, when determining the potential mean estimated phase error, is configured to:
determine the potential mean estimated phase error based on a particular quantity of most significant bits (MSBs) of the amplitude and another particular quantity of MSBs of the de-rotated resultant phase.

5. The optical receiver of claim 1, where the input signal is modulated according to an M-ary quadrature amplitude modulation (QAM) format.

6. The optical receiver of claim 1, where the digital signal processor is further configured to:
delay the input signal by a particular amount of time; and
where the digital signal processor is to recover the information included in the plurality of digital signals, the digital signal processor is to:
combine the input signal with the set of mean estimated phase errors to recover the information included in the plurality of digital signals based on delaying the input signal by the particular amount of time.

7. The optical receiver of claim 1, where the digital signal processor, when determining the set of mean estimated phase errors for the set of digital signal groups, is configured to:
determine the set of potential mean estimated phase errors using a plurality of phase detectors and a polar coordinate lookup table.

8. A carrier recovery device, comprising:
a delay matching component configured to:
delay an input signal by a particular amount of time;
a polar conversion component configured to:
receive a real value and an imaginary value associated with a digital signal representing a symbol of the input signal and generate a phase value and an amplitude value, corresponding to the real value and the imaginary value, for the input signal;
a phase detection component including a plurality of phase detectors,
a phase detector, of the plurality of phase detectors, being configured to:
de-rotate the phase value based on a de-rotating input to generate a de-rotated resultant phase value,
the de-rotating input being feedback based on performing phase detection on another symbol,
use the amplitude value and the de-rotated resultant phase value to perform a look-up in a polar coordinate look-up table to determine a quantized phase error,
determine a mean estimated phase error based on the quantized phase error and one or more other quantized phase errors associated with one or more other digital signals representing symbols of the input signal;
a phase deselection component configured to:
select a particular phase detector, of the plurality of phase detectors, from which a particular mean estimated phase error is to be utilized, and
provide the particular mean estimated phase error; and
a combiner component configured to:
receive the input signal from the delay matching component,
receive the particular mean estimated phase error from the phase deselection component, and
combine a portion of the input signal with the particular mean estimated phase error to interpret one or more digital signals representing symbols of the input signal included in the portion of the input signal.

9. The carrier recovery device of claim 8, where two or more phase detectors of the plurality of phase detectors are operated in parallel.

10. The carrier recovery device of claim 8, where, when providing the particular mean estimated phase error, the phase deselection component is configured to:
provide the particular mean estimated phase error to the phase detection component as feedback based on performing phase detection on another digital signal representing another symbol.

11. The carrier recovery device of claim 8, where the input signal is modulated using a quadrature amplitude modulation (QAM) format.

12. The carrier recovery device of claim 8, where the particular mean estimated phase error is generated based on averaging a plurality of quantized phase errors.

13. The carrier recovery device of claim 8, where the input signal is at least one of:
a digital subcarrier signal with a plurality of subcarriers, or
a single carrier signal.

14. The carrier recovery device of claim 8, where, for a quantity of symbols received during a single clock cycle of the input signal, the phase detection component and the phase deselection component are configured to generate, during another single clock cycle, a set of mean estimated phase errors for a set of digital signal groups of the input signal,
the set of mean estimated phase errors including the particular mean estimated phase error.

15. A method, comprising:
receiving, by a device, a set of digital signals representing a set of symbols of an input signal during a single clock cycle;
determining, by the device, a set of phases for the set of digital signals;
de-rotating, by the device, the set of phases based on a set of potential de-rotating input phases to generate a set of de-rotated resultant phases;
determining, by the device, a set of mean estimated phase errors for the set of digital signals based on the set of de-rotated resultant phases, a set of amplitudes for the set of digital signals, and a look-up table associated with a modulation format of the set of digital signals; and
determining, by the device, information carried by the set of digital signals based on the set of digital signals and the set of mean estimated phase errors.

16. The method of claim 15, further comprising:
receiving, for a digital signal group of the set of digital signals, feedback indicating one or more potential de-rotating input phases for the digital signal group, the feedback being generated based on another digital signal group immediately preceding the digital signal group; and
where de-rotating the set of phases further comprises:
de-rotating the set of phases based on the feedback.

17. The method of claim 15, where determining the set of mean estimated phase errors further comprises:
determining the set of mean estimated phase errors, for each digital signal group, of a plurality of digital signal groups of the set of digital signals, and for each potential de-rotating input, of the set of potential de-rotating inputs, in parallel using a plurality of phase detectors; and
performing deselection of outputs of one or more phase detectors, of the plurality of phase detectors, based on determining the set of mean estimated phase errors in parallel.

18. The method of claim 15, where the input signal is a quadrature amplitude modulation (QAM) format signal with an in-phase component (I) and a quadrature component (Q); and
the method further comprising:
performing a polar coordinate conversion on the I and Q components of the input signal to generate the set of phases and the set of amplitudes.

19. The method of claim 15, where the device is a photonic integrated circuit (PIC).

20. The method of claim 15, further comprising:
grouping the set of digital signals into a set of digital signal groups,
each mean estimated phase error, of the set of mean estimated phase errors, being associated with a particular digital signal group of the set of digital signal groups.

* * * * *